Jan. 1, 1929.   1,697,710
A. BOSTROEM
SWIVEL JOINT
Filed Nov. 30, 1921
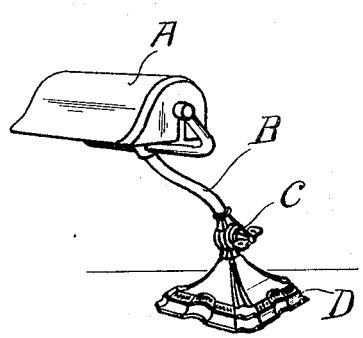
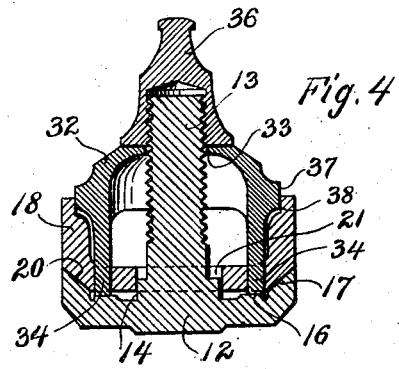
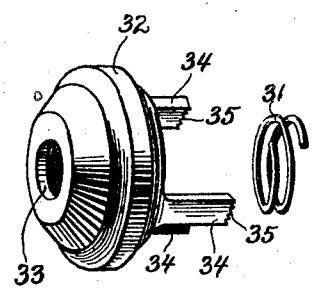
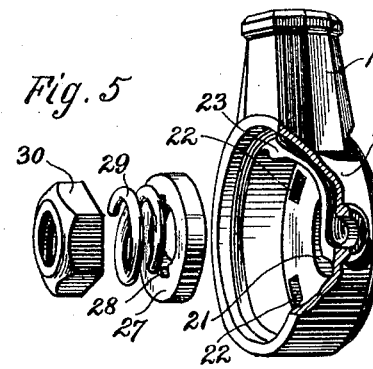
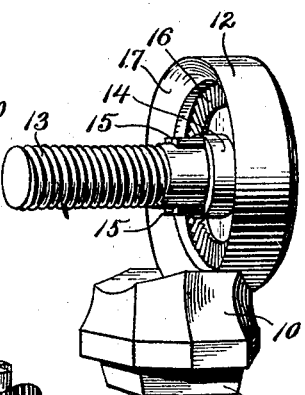
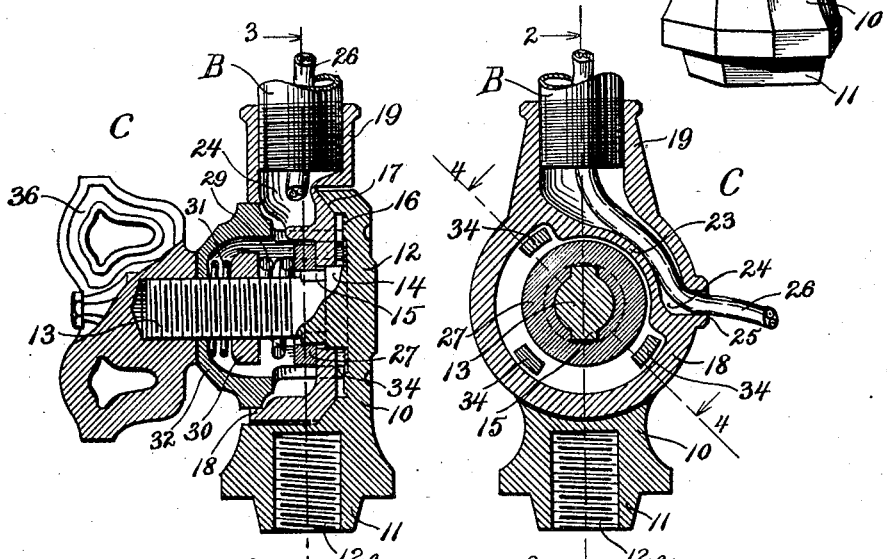

Patented Jan. 1, 1929.

1,697,710

UNITED STATES PATENT OFFICE.

AUGUST BOSTROEM, OF NEW YORK, N. Y., ASSIGNOR TO SAMUEL ROBERT SCHWARTZ, OF NEW YORK, N. Y.

SWIVEL JOINT.

Application filed November 30, 1921. Serial No. 519,026.

My invention relates to an improved swivel joint to be used in particular with a portable electric desk lamp of well-known type, altho manifestly it may be used on other types of lamps and also in other arts. Joints as heretofore constructed have been provided with manually operated locking means on the release of which the parts of the joint are entirely free to rotate relatively to each other. In my improved construction I employ a resilient member to keep the parts of the joint in operative engagement under a tension sufficient to prevent relative motion when left undisturbed but not sufficient to prevent manual adjustment of the parts of the joint. The manually operated locking means is at the same time retained, for use when it is desired to positively interlock the parts of the joint.

My invention is particularly useful in connection with lamps in which a glass shade is supported on the upper member of the joint. With the ordinary joint accidental release of the upper member during the process of adjustment may result in the breaking of the glass shade as it strikes the table. Such an occurrence is impossible when my joint is used, as will more fully appear from the drawings and the detailed description.

In the drawings:

Fig. 1 is a view in perspective showing the application of my invention to an electric desk lamp of known type.

Fig. 2 shows a cross-sectional view of my improved swivel joint, the section being taken on line 2—2 of Fig. 3 looking in the direction of the arrows.

Fig. 3 is a cross-sectional view of the joint taken on the line 3—3 of Fig. 2, looking in the direction of the arrows.

Fig. 4 is a cross-sectional view of my joint taken on the line 4—4 of Fig. 3, looking in the direction of the arrows, with parts omitted and Fig. 5 is a perspective view of the separate parts of the joint axially alined in the order in which they would be assembled.

In Fig. 1, which represents a complete lamp, A denotes a shade, B a bracket to support the shade and an incandescent lamp inside the shade, C my improved swivel joint and D a base. The swivel joint permits adjustment of the shade to any desired level.

Mounted on the base D by an extension 11 threaded as at 12ª to receive a screw extending upward from the base (and which is not illustrated as it is not an essential part of my invention) is a standard 10 carrying a cylindrical or drum-shaped hollow chamber 12, closed at one end. Projecting from the closed end is a bolt 13 threaded at its outer end and widened at its inner end as shown at 14. Adjacent the widened portion 14 is a pair of lugs 15 which do not extend radially beyond the portion 14 so that a part having a bore fitting snugly against 14 can slide over the lugs 15. Arranged concentrically with respect to the bolt 13 on the inside of the chamber 12 is a rack 16. An annular beveled surface 17 is provided at the open end of chamber 12 to afford a frictional bearing surface. The purpose of the above parts will appear from what follows.

A second drum-shaped chamber 18, is provided with a threaded extension 19 adapted to receive the threaded end of bracket B. An annular beveled friction surface 20 is formed on one end of the chamber 18 and this is so proportioned as to bear against the beveled surface 17 when the two are brought into engagement, and, under pressure, to afford the frictional resistance necessary to keep the parts of the lamp in adjusted position.

In order to enable chambers 12 and 18 to be brought into engagement a hole 21 is provided in one end of chamber 18 so that the bolt 13 can pass therethrough. The walls of hole 21 and the widened portion 14 of the bolt 13 form engaging bearing surfaces whose function it is to keep chambers 12 and 18 properly centered with respect to each other, thereby assuring proper contact of the beveled friction surfaces 17 and 20.

The end of chamber 18 is further provided with openings 22 for a purpose which will appear. A separating wall 23 serves to form a chamber 24 with an outlet 25 through which passes an electric conductor or conductors 26 by means of which electrical energy is supplied to the lamp.

For keeping the above mentioned parts of the joint in frictional engagement, a spring tension device is employed which consists of a washer 27, a helical spring 29 and a nut 30. The washer 27 is adapted to fit over the bolt 13, two recesses 28 being provided so that the washer may pass over the lugs 15 and be held thereby against rotation with respect to the bolt 13. The spring 29 is free to slip over the bolt 13 and is held under tension by the nut 30 which engages the threads on the bolt. Any desired tension may be obtained by suitable adjustment of the nut.

It will be perceived that the parts 27, 29, and 30 move together with bolt 13 owing to the lugs 15 engaging recesses 28 in the washer, while the chamber 18 moves between washer 27 and friction surface 17. There is therefore no danger of the nut 30 working loose as chamber 18 is moved in the process of adjusting the lamp, thereby releasing the spring 29 with consequent release of all parts of the joint; on the contrary once adjusted the nut will remain in its adjusted position and hold the spring under the desired tension. A helical spring 31 is mounted on the bolt 13 between nut 30 and a locking cap 32, which latter is provided with a hole 33 to fit over the bolt and with three spaced arms or extensions 34 having rack teeth 35 at their extremities. The arms 34 are designed to pass through and snugly fit the openings 22 in chamber 18 and with their teeth 35 to engage the circular rack 16 already described. It is the function of spring 31 to force the locking cap 32 outwardly so as to disengage its arms 34 from the rack 14. Should this engagement be desired the cap is moved in the requisite manner by adjusting the wing nut 36, which has the effect of compressing the spring 31 and counteracting its releasing action.

To make the action of the locking cap 32 more clear it may be pointed out that the same is free to slide outwardly with regard to chamber 18 but cannot rotate relatively to the same. When therefore the cap is forced into engagement with rack 16 both the cap 32 and the chamber 18 are locked against rotation relative to chamber 12, so that the entire joint is locked. When the wing nut is adjusted so as to permit spring 31 to force cap 32 out of engagement with rack 14, the joint may be adjusted and the tension provided by spring 29 is sufficient to hold the parts in their adjusted position.

In order to protect the inner parts of the joint and to prevent dust and moisture from getting inside same the locking cap is provided with a cylindrical surface 37 and the chamber 18 with a corresponding surface 38 which surfaces are always in engagement during all ordinary movements of the cap while same is adjusted and provide a dust-proof closure.

To make the use of the joint more clear we will assume that a person desires to lower the shade of the lamp shown in Fig. 1. He grasps the wing nut with one hand and turns it so as to release the locking cap. With the same hand, and without in any way holding up the shade or using his other hand, he can then raise or lower the shade and bracket to the desired level and then, if desired, lock it in its new position by manipulating the wing nut. The "fool-proof" feature thus provided, that is, the absence of any necessity for caution in making the adjustment will be particularly useful in places where children or irresponsible persons have access to the lamp or other device on which the joint is used.

Having fully described my invention what I claim and desire to secure by Letters Patent is:

1. In a swivel joint, two members relatively movable, means for holding said members in engagement without preventing their relative motion, means on one of said members to engage said first means and prevent rotation of same with regard to said member, and means for positively locking said members against relative motion.

2. In a swivel joint, two relatively movable members, normally inoperative locking means to prevent relative motion of said members and means on one of said members to prevent rotation of said locking means with relation to said member when said locking means is in either operative or inoperative position.

3. In a swivel joint, two relatively movable members, normally inoperative locking means to prevent relative motion of said members, means on one of said members to prevent rotation of said locking means with relation to said member when said locking means is in either operative or inoperative position and a manually operable member for causing the locking means to move into its operative position.

4. In a swivel joint, two relatively movable members, locking means to prevent relative motion of said members, spring means to normally hold the locking means in inoperative position, means on one of said members to prevent rotation of said locking means with relation to said member when said locking means is in either operative or inoperative position and a manually operable member for causing the locking means to move into its operative position.

5. In a swivel joint, two relatively movable members, normally inoperative locking means to prevent relative motion of said members, means on one of said members to prevent rotation of said locking means with relation to said member when said locking means is in either operative or inoperative position, and means on said other member adapted to engage the locking means whereby rotation of the locking means is prevented with regard to the second member.

6. In a swivel joint, two relatively movable members, locking means to prevent relative motion of said members, means on one of said members to prevent rotation of said locking means with relation to said member when said locking means is in either operative or inoperative position, means on said other member adapted to engage the locking means whereby rotation of the locking means is prevented with regard to the second member, and means acting to normally move said locking means out of engagement with said second member.

7. In a swivel joint, two relatively movable members, locking means to prevent relative motion of said members, spring means to normally hold the locking means in inoperative position, means on one of said members to prevent rotation of said locking means with relation to said member when said locking means is in either operative or inoperative position, a rack on said other member adapted to engage teeth on the locking means, and manually operable means to cause the locking means to move into operable position in opposition to the action of the spring means so as to cause the teeth on the locking means to engage the rack and thereby prevent relative movement of the members.

8. In a swivel joint, two relatively movable members, interengaging friction surfaces on said members, a partly threaded bolt carried by one of said members, a hole in the other member to furnish a seat for the unthreaded portion of the bolt, lugs on the bolt, a washer frictionally engaging the other member and also engaging the lugs on the bolt, a helical spring surrounding the bolt and engaging the washer, a nut for applying pressure to the spring engaging the threaded portion of the bolt, a locking member slidably mounted on the bolt, and means to cause said locking member to lock said two movable members against relative rotation.

9. In a swivel joint, two relatively movable members, interengaging friction surfaces on said members, a partly threaded bolt carried by one of said members, a hole in the other member to furnish a seat for the unthreaded portion of the bolt, lugs on the bolt, a washer frictionally engaging the other member and also engaging the lugs on the bolt, a helical spring surrounding the bolt and engaging the washer, a nut for applying pressure to the spring engaging the threaded portion of the bolt, a locking member slidably mounted on the bolt, adjustable means to cause said locking member to lock said two movable members against relative rotation, and means opposing the action of said adjustable means and thereby preventing the locking action of said locking member when said adjustable means is in certain positions.

10. In a swivel joint, a member, an annular friction surface on said member, a rack on said member, a partly threaded bolt on said member, an unthreaded portion at the base of the bolt of greater diameter than the threaded portion of the bolt, a pair of lugs on the bolt, a second member, a hole in the second member affording a bearing for the widened portion of the bolt, an annular friction surface on said second member adapted to engage the first-mentioned annular friction surface, openings in the second member, a washer adapted to fit over the bolt and to seat on said second member, recesses in said washer adapted to receive the lugs on the bolt, a spring adapted to slide over the bolt and exert pressure against the washer, a nut engaging the threads on the bolt, a locking member adapted to slide over said bolt, tooth-carrying arms on said locking member adapted to pass through the openings in said second member and to engage the rack on said first member, a second spring adapted to slide over the bolt and mounted so as to exert pressure between the nut and the locking member, and a wing nut having threaded engagement with the bolt adjacent the locking member and adapted to move same as said wing nut is turned.

11. In a swivel joint, two relatively movable members and a locking member whereby said members may be positively locked against relative motion, one of said first members being formed into a hollow chamber having an opening at one side and said locking member shaped to fit into said opening so as to form a closed dust-proof casing, and means located within the casing to hold the movable members together without preventing their relative motion.

12. In a swivel joint, a pair of frictionally engaging members, locking means mounted adjacent one of said members and forming in conjunction therewith, a hollow chamber, spring means within the chamber for holding the two members in engagement without preventing their relative motion, spring means located within the chamber for normally holding the locking means in inoperative position, said members and the locking means being arranged in juxtaposition so that dust cannot enter inside the joint.

13. In a swivel joint as in claim 8, the locking member located in juxtaposition to said other member, and the locking member together with said other member formed so as to provide a closed casing which contains said washer, said spring and said nut.

In testimony whereof, I have signed my name to this specification this twenty-ninth day of November, 1921.

AUGUST BOSTROEM.